Patented Mar. 12, 1946

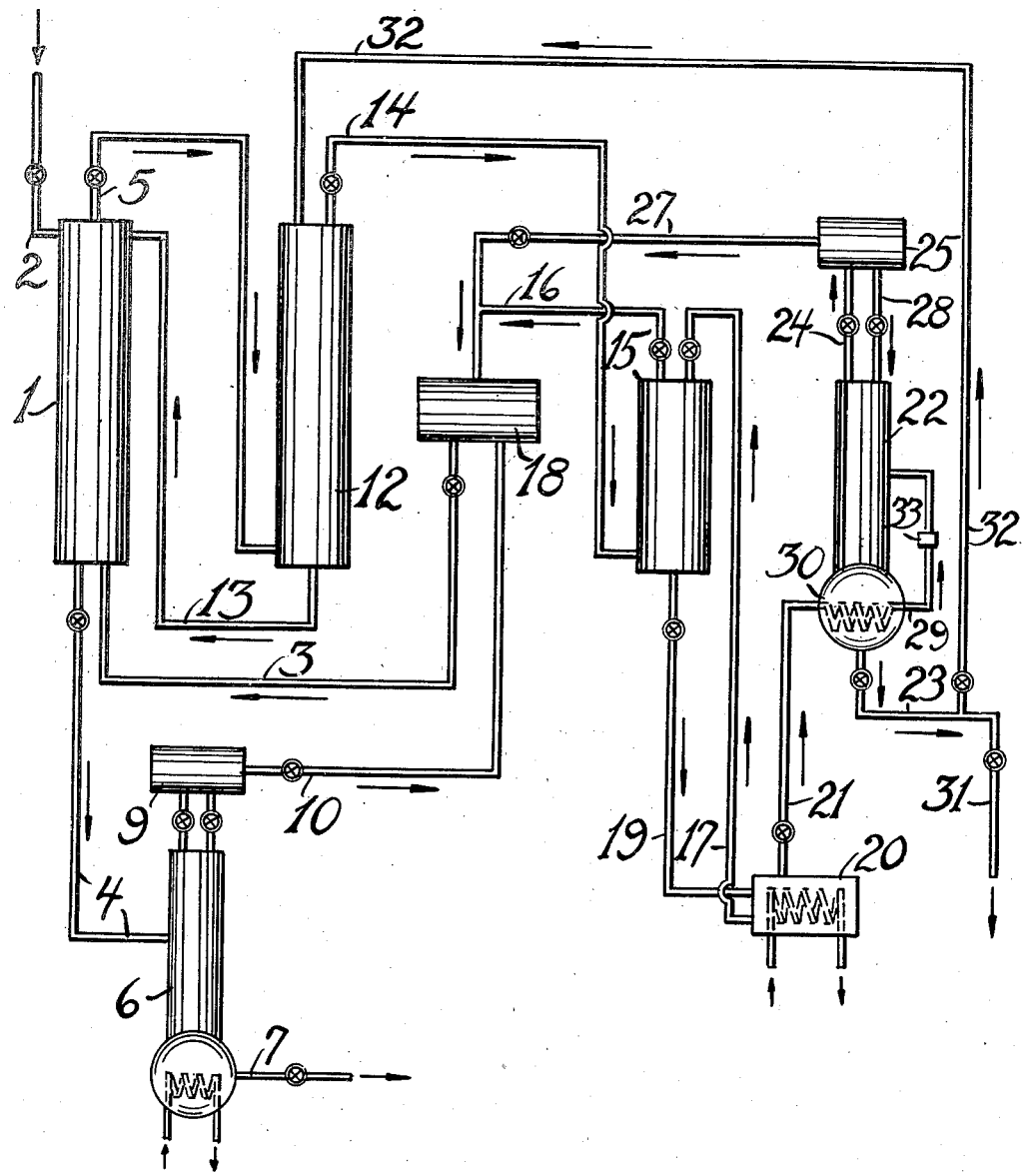

2,396,302

UNITED STATES PATENT OFFICE 2,396,302

REFINING OF MINERAL OILS

George H. Cummings, State College, Pa., William J. Sweeney, Elizabeth, N. J., and Merrell R. Fenske, State College, Pa., assignors of one-half to Standard Oil Development Company, a corporation of Delaware, and one-half to Röhm & Haas Company, a corporation of Delaware Application December 7, 1940, Serial No. 369,054

14 Claims. (Cl. 196—13)

The present invention relates to the refining of mineral oils and is particularly concerned with the separation and recovery of naphthenes from feed mixtures containing the same. In accordance with the present process, mineral oils are treated in a manner to segregate the naphthenes, utilizing a particularly desirable solvent which comprises liquid ammonia. To this may be added a modifying solvent which is characterized by having the ability to change the solvent power of the ammonia. This application contains subject matter in common with and is a continuation-in-part of our application No. 353,448 filed August 21, 1940.

Within the last few years it has become apparent that petroleum and its fractions are a potential source of many desirable organic compounds. Some of these compounds, such as aromatics, naphthenes, and paraffins, are present in crude unrefined petroleum oils and may be increased in concentration and amount by various operations. Other types for example, olefins and diolefins, may be formed by subjecting certain fractions to various cracking processes and related operations. Separation processes are vital for the production of these organic compounds, not only in the final preparation of them in a pure state, but also in the preparation of suitable feed fractions which are to be further processed. Distillation operations have been used for the separation of various fractions of petroleum, but are not suited for the segregation of these constituents in a pure state due to the overlapping of boiling points of many of the desired constituents with other components. More recently solvent extraction operations have been employed in conjunction with distillation operations in order to secure efficient separations. In these solvent treating processes organic solvents, such as phenol, furfural, cresols, nitrobenzene, aniline, beta beta' dichlorodiethyl ether and the like, have been employed for the segregation of the relatively more aromatic type constituents from the relatively more paraffinic type constituents of lubricating oils. However, these organic solvents are not satisfactory for segregating constituents boiling in the lower molecular weight boiling range, particularly in the range below the boiling range of lubricating oils. Inorganic solvents, such as sulfur dioxide, sulphuric acid, and solutions containing copper and silver salts have been used for segregating constituents boiling in the lower molecular weight boiling range.

Although numerous solvents have been proposed for separating lower molecular weight aromatic and olefin constituents from paraffin constituents, these solvents which are applicable for the selective extraction of unsaturated compounds from saturated compounds generally are not satisfactory for segregating cyclic saturated compounds, such as naphthenes, from the open chain saturated compounds or paraffins. For example, although sulfur dioxide has a high preferential selectivity for the more unsaturated or polar constituents, such as aromatics and olefins, over the saturated constituents, such as naphthenes and paraffins, its selectivity for the saturated cyclic compounds, namely, naphthenes, over the open chain saturated compounds, namely, paraffins, is so low as to make this solvent useless for effecting separations between these two hydrocarbon classes.

We have discovered that liquid anhydrous ammonia possesses a valuable selectivity for naphthenes over paraffins, in addition to its selectivity for the more polar over the less polar compounds. Herein resides one element of our invention. Another element is concerned with extending the solvent power of ammonia to cover a wide range of hydrocarbons, without impairing its selectivity, as hereinafter described.

In order to secure a clear concept and value of a particular solvent, a selectivity factor, termed beta, is employed. This factor is quite analogous to the alpha factor employed in distillation and may be represented by the following formula:

$$\text{Beta} = \left(\frac{Y_A}{Y_B}\right)\left(\frac{X_B}{X_A}\right)$$

in which the terms X and Y are used to denote concentrations in the raffinate and extract or solvent phases, respectively, while A and B denote, respectively, the more soluble and less soluble components or portions of the material being extracted. Through the concept of beta the limiting conditions for any separation can be determined as described by Varteressian and Fenske, Ind. Eng. Chem. 29, 270 (1937). Thus, $Y_A/Y_B$ equals the ratio of the more soluble component to the less soluble component in the solvent or extract phase, and $X_A/X_B$ equals the ratio of the more soluble component to the less soluble component in the oil or raffinate phase. Beta is a numerical measure of the solvent's selectivity or the solvent's ability to preferentially dissolve one particular type of constituent to the exclusion of other types of constituents.

Proper solubility of hydrocarbon in solvent is vitally important in the efficient extraction and separation of pure type compounds. The extractable component must not be completely miscible with the solvent under the conditions of extraction for otherwise this component cannot be prepared in a pure state. The solubility should not be too high for we have found that the selectivity or beta is closely dependent upon the solubility and when the hydrocarbon dissolves to too great an extent in the solvent, the selectivity may be so low as to make the process uneconomical. In general, we prefer that the solubility of hydrocarbon in the solvent never exceed 35%. On the other hand, it is also important that the solubility, particularly at the hydrocarbon feed point, not be too low, for otherwise too high a solvent-to-oil ratio will be required to remove the extractable component from the feed. We prefer that the solubility at the hydrocarbon feed point lie in the range of 5% to 30%, particularly between 10% and 20%. For the most efficient extractions we have found that it is desirable to employ two extraction zones, a stripping zone where the extractable component is removed as completely as possible from the feed, and an enriching zone where the extractable component is purified from the other components which are of necessity partially dissolved, to a minor degree, in the stripping zone. Because of the different solubility characteristics of the different components, it is frequently desirable to employ different dissolving capacities of the solvent in the two zones.

From the foregoing it is apparent that proper solubility control is vital to efficient extraction. Control by temperature is not always feasible or possible. Temperatures requiring refrigeration are undesirable as they frequently make the process uneconomical. Furthermore, we have found that the selectivity or beta of ammonia decreases at higher temperatures often to a prohibitive degree. In some cases the components may not exist in a liquid state at the desired temperatures, in other cases the pressures may be so high as to require special equipment.

It is known in the art to control solubility over narrow ranges by the use of modifying solvents. While well understood in principle, this method has not worked well in practice. A primary objection to the use of modifying solvents is that a loss in selectivity of the solvent results. For example, the use of benzene with sulfur dioxide reduces the selectivity of this solvent to an almost prohibitive degree. Likewise, we found in one case that the use of a paraffinic oil with sulfur dioxide reduced its selectivity to one-twentieth of its former value. It is often difficult to find modifying solvents which are compatible with primary solvents. For example, very few liquids may be added to furfural or beta beta' dichlorodiethyl ether due to their relatively great chemical reactivity. Few, if any, liquids soluble in sulfur dioxide will reduce its solvent power without a chemical reaction occurring or without causing corrosion of the equipment. Water is soluble in phenol to only a limited extent and often causes emulsion and corrosion difficulties.

We have, further, discovered that the useful solvent range of ammonia for selective extraction of naphthenes from paraffins may be extended over a wide range of molecular weight without impairing its selectivity. We have discovered that providing the characteristics of ammonia be modified with the desired modifying agent, it is possible to treat feed oils for the production of products which otherwise could not be secured either by the use of ammonia alone or by means of closely related solvents due to the restricted solvent power of liquid anhydrous ammonia and the low selectivity of other solvents for naphthenes over paraffins. We have discovered that ammonia is compatible with a variety of substances capable of varying its solvent power for hydrocarbons, that when these modifying solvents for adjusting solvent power over a definite range are used, little, if any, loss in selectivity occurs, and that there is substantially no increase in corrosiveness or in emulsions. When ammonia is modified as disclosed herein, its solvent power may be varied over a range such that naphthenes over a wide molecular weight range may be efficiently segregated and recovered from the corresponding paraffins.

Suitable modifying solvents can be chosen from a relatively large group. Any substances which will not react but which when added to the system will alter the solvent power of the ammonia may be used, specific examples of which are the higher glycols, ethers and ether-alcohols, methanol and other alcohols, alcohol-amines, aniline, pyridine, the methylamines and other low molecular weight aliphatic amines to raise the solvent power and water, ethylene glycol, formamide, ethylene diamine and various paraffinic hydrocarbons to reduce the solvent power. We have found that water, ethylene glycol, the methylamines, the lower molecular weight diamines, and higher molecular weight paraffinic hydrocarbons are especially effective. In certain operations we find it advisable to add one type of modifying solvent in one zone of the extraction and another type in another zone, the resulting solvent being composed of ammonia, a modifying solvent for increasing the solvent power of the ammonia, and a modifying solvent for decreasing it. It is essential that the solvent be composed predominantly of ammonia, present in a concentration above 50%, preferably above 75%. It is not necessary that the modifying solvent be selective, it is only necessary that it increase the solvent power of the ammonia.

Furthermore, it is not necessary that the modifying solvent be completely soluble in the liquid ammonia. We have found particularly that hydrocarbons which distribute themselves between the extract and raffinate phases in such a way that they appear predominantly in the raffinate phase are very efficient in lowering the solvent power of the liquid ammonia. It is to be understood that such hydrocarbons, to be added to reduce the solvent power of ammonia, will be selected so they can be separated from the hydrocarbons being extracted usually by means of distillation.

Our modifying solvents may be added directly to the ammonia, or may be added to a countercurrent treating system at a plurality of points. We have found the addition of the modifying solvent at one or more points in a countercurrent extraction path is particularly effective. In this way the solubility is controlled so as always to be within the proper limits in order that the selectivity or beta is relatively high.

The ammonia and the modifying solvent may partition themselves between the extract and raffinate phases in a different concentration ratio. As a result, when countercurrent treating operations are being employed, the composition of the solvent may change along the countercurrent path. In general, this composition change will have a beneficial effect, for the solvent usually decreases in solvent power because of this change as it flows through the countercurrent extraction path. This effect also aids in maintaining the solubility at a more constant value, and leads to more efficient extraction.

The amount of modifying solvent added depends upon the degree to which the solvent power is to be changed, and will thus depend upon the mixture being extracted and the particular modifying solvent is used. In general, the solvent mixture should comprise above 50% ammonia, preferably above 75% ammonia.

We have found that it is possible and frequently desirable to carry out the entire extraction operation for naphthenes from paraffins at the same temperature and with the same solvent composition. In carrying out separations in this manner, a desirable operating temperature is employed such that neither refrigeration nor very high temperatures with corresponding poor selectivities are required. The amount of modifying solvent necessary is then determined which will control the solubility of the naphthenes in the ammonia in the range from about 15 to 35%, preferably in the range from about 20 to 25%.

In order to further illustrate our invention, the following examples are given which should not be construed as limiting the same in any manner whatsoever.

Example 1

A feed mixture consisting of 30% methylcyclohexane in n-heptane was extracted in a countercurrent extraction apparatus similar to Figure 1 at 100° F. with a solvent comprising 25% monomethylamine and 75% ammonia. Under these conditions, when using a solvent-to-oil ratio of 10/1, methylcyclohexane and n-heptane products were obtained in a purity of 95%. Had this separation been carried out with sulfur dioxide there would have been required a temperature of +50° F. and a solvent-to-oil ratio of 50 to 1.

Example 2

A feed mixture comprising 25% methyl naphthalene, 25% tetralin and 50% decane was extracted in a countercurrent extraction apparatus similar to Figure 1 at 100° F. with a solvent comprising 92% ammonia and 8% water. Methyl naphthalene was obtained as an extract in a purity of 98%. The raffinate was re-extracted with liquid anhydrous ammonia at 100° F. to yield a second extract comprising 98% tetralin, and a second raffinate comprising 98% decane. A solvent-to-oil ratio of 5:1 was employed.

Example 3

It is impossible to separate cyclopentane from neohexane by any practical distillation process. It is believed these two compounds form a constant boiling mixture. Many azeotropic fractional distillations also do not separate them. However, using liquid anhydrous ammonia as a solvent, a feed mixture containing 25% cyclopentane and 75% neohexane can be separated to yield cyclopentane of 95% purity by extracting in a countercurrent extraction apparatus similar to Figure 1 at a temperature of 95° F., and at a 10 to 1 solvent-to-oil ratio.

The present invention may more readily be understood by reference to the attached drawing illustrating a preferred modification of the same. For the purpose of illustration, it is assumed the feed comprises 30% methylcyclohexane in n-heptane, and the solvent comprises 25% monomethylamine and 75% ammonia.

The hydrocarbon feed mixture is introduced by means of line 2 into extraction tower 1. The feed is introduced into the top of tower 1 although an intermediate feed point may have been used. By extraction tower 1 we mean any suitable countercurrent phase contacting device. It may be a series of mixers and settlers, a packed tower, and the like. These phase contacting paths are equipped with heating and cooling devices so that the temperature may be controlled at any desirable level or controlled to produce a temperature gradient. For this specific case it is assumed that the temperature is controlled at 100° F. The ammonia-monomethylamine is introduced by means of line 3 into tower 1. Here it contacts the down-coming oil phase and dissolves substantially all the methylcyclohexane together with minor proportions of n-heptane. The extract phase leaves tower 1 through line 5 and enters near the bottom of extraction tower 12. This tower is also run at a constant temperature of about 100° F., and is similar in construction to tower 1. In tower 12 most of the n-heptane is removed from the extract phase so that the extract phase leaving this tower at the top consists essentially of the methylcyclohexane dissolved in solvent. This extract phase is removed by means of line 14 and passed to extraction tower 15 where it contacts countercurrently a higher boiling paraffinic mineral oil which enters this tower through line 17. This oil dissolves all the hydrocarbon from the solvent so that hydrocarbon-free solvent leaves tower 15 by means of line 16 and is returned to storage tank 18. The paraffinic oil leaving the bottom of tower 15 contains all the hydrocarbons and some solvent. It is taken by means of line 19 to evaporator 20 where all the hydrocarbons and solvent are flashed off. The pure paraffinic oil is then returned to tower 15 by means of line 17 while the hydrocarbon and solvent vapors are taken by means of line 21 to coil 30 in the bottom of distillation column 22. The vapors condense in this coil and furnish the necessary heat for column 22, which is run at a lower pressure than evaporator 20. The condensed vapors enter column 22 through line 29 after passing through pressure reducing valve 33. The solvent is removed overhead by means of line 24 and passed to condenser 25. Part of the solvent condensate is returned by means of line 28 as reflux to prevent any hydrocarbon from distilling over while the remainder is taken by means of line 27 to solvent storage 18. Solvent-free hydrocarbon is obtained in the still of 22 which is removed by means of line 23. Part is taken from 31 as a final extract product while the rest is returned as reflux to extraction tower 12 by means of line 32. The hydrocarbon layer from the bottom of this tower is returned to tower 1 by means of line 13. The hydrocarbon layer from the bottom of tower 1 consists mainly of n-heptane containing a little solvent. This is taken by means of line 4 to distillation column 6 where the solvent is removed overhead and returned to solvent storage 18 by means of line 10. Solvent-free raffinate product is removed from column 6 by means of line 7. When operating in a manner substantially as above described, products containing 95% methylcyclohexane, and 95% n-heptane from a feed mixture containing 30% methylcyclohexane were obtained.

It should be emphasized that an aromatic or unsaturated hydrocarbon of approximately the same molecular weight as a naphthene is more soluble in our ammonia solvents than the naphthene. Consequently, if naphthenes are to be the principal or main extraction product produced by our process, the feed mixture is preferably aromatic- and unsaturate-free. Further, for obtaining naphthenes of maximum purity directly from our extraction process, we prefer to extract mixtures of a relatively narrow molecular weight range due to the effect of molecular weight on solubility. A range of about 15 units in molecular weight is usually satisfactory.

In case aromatics and/or unsaturates are present along with the naphthenes, our process is particularly applicable to segregating the aromatics and/or unsaturates from the naphthenes at the same time that the naphthenes are being segregated from the paraffins, for, according to our invention, the solubility of each of these hydrocarbon types may be maintained at values to make such a separation very practical. For example, if a hydrocarbon mixture of 95 to 125 molecular weight range containing aromatics and olefins along with naphthenes and paraffins is to be extracted, we prefer to segregate the aromatics and olefins at the end of the enriching section using an ammonia solvent of reduced solvent power, while at the end of the stripping section a raffinate consisting of substantially pure paraffins is withdrawn, this raffinate having been extracted in the stripping section with an ammonia solvent of enhanced dissolving power. At some point between the above-mentioned extract and raffinate ends of this primary extraction system, the naphthenes will be concentrated. A point is selected in this primary extraction path where the naphthenes are freed of either the paraffins or the aromatics and olefins. At least part of one of the phases is then withdrawn, and further extracted in a secondary extraction system with an ammonia solvent of the correct dissolving power to free the naphthenes of the other remaining components. The phase from the secondary extraction system containing substantially pure naphthenes is then withdrawn and heated to recover the naphthenes from the solvent, while the other secondary extraction phase is returned to the primary extraction path at a point near the original withdrawal point.

A process, such as the one above described, is known as side-stream withdrawal. This is a particularly desirable method of processing when using ammonia solvents with a multi-component feed mixture.

It is obvious that if paraffins were not present in the feed mixture, then the naphthenes could be separated from the aromatics and unsaturated constituents as a primary raffinate in the ammonia extraction process herein described.

These ammonia solvents are also applicable to the segregation of naphthenic-type hydrocarbons from relatively narrow fractions having molecular weights up to about 500. In these instances, the material is preferably free of more polar hydrocarbon types such as aromatics and unsaturates. Also, modifying solvents to increase the solvent power are usually required in extracting these higher molecular weight fractions. Methylamine is a particularly desirable modifying solvent in these instances. Naphthenic-type hydrocarbons in these higher molecular weight materials are usually classified and recognized by one or more of the following features: (a) their relatively low pour points with respect to the paraffinic hydrocarbons of similar molecular weight; (b) an intermediate value of viscosity index, ranging, for example, from about 50 to about 110 for hydrocarbons otherwise aromatic-free; (d) a value of aniline point intermediate those for aromatics and paraffins, for example, between 50 and 100° C.; and (e) values of density, refractive index, aniline point and molecular weight which according to the method of Waterman (J. Inst. Petrol. Technologists, 21, 661, 1935) would be characterized as naphthenes.

Ammonia is the only liquid normally gaseous inorganic solvent known which is capable of being modified with a modifying agent for securing separations herein outlined. It is, furthermore, the only solvent which may be readily separated from the feed oil and which may be also readily separated from the modifying agent. Ammonia is an inorganic solvent which together with a satisfactory modifying agent as disclosed in the present application will efficiently and economically separate complex naphthene organic substances from hydrocarbon oils.

The following definitions relate to the claims and the preceding specification.

By a predominate proportion of liquid ammonia we mean liquid ammonia together with modifying solvent such that the ammonia contributes principally to the solvent's selectivity, as illustrated in the preceding examples.

Ammonia solvent means liquid ammonia together with any modifying solvent.

By a modifying solvent we mean any liquid which when added to the system will alter the solvent power of the solvent. The modifying solvent may or may not be a selective solvent, its determining characteristic being only that it will change the dissolving capacity of the liquid ammonia.

The term zone denotes one or more extraction stages or the equivalent which are properly interconnected, as already demonstrated, wherein continuity of flow and control of operating variables are maintained. By a first zone we mean that portion of the extraction path between which the feed oil enters and the raffinate phase leaves the system. By a second zone we mean an extraction path along the line of solvent flow beyond the point of feed oil introduction.

Extracting a feed mixture means extracting the mixture in a first zone. It may also include the extraction of the more soluble components of the feed in a second extraction zone.

Relatively high dissolving capacity means the ammonia solvent dissolves the extractable component or components to a considerable degree if not completely, and such a solvent is capable of dissolving appreciably the raffinate portions or components. Relatively low dissolving capacity means the ammonia solvent is incompletely miscible with the extractable component or components, and the solubility of such materials in the solvent is usually 20 to 30% or lower, while the raffinate portions or components are relatively insoluble, i. e., the solubility of such material is of the order of 3 to 10% or less.

By mineral oil we mean mixtures that are predominantly hydrocarbons, such as exist in petroleum or its fractions, or predominantly hydrocarbon mixtures obtained by processing such fractions.

By naphthene we mean substances that contain a relatively saturated cyclic hydrocarbon structure. For the most part the cyclic structure is composed of methylene or substituted methylene groups such as in cyclopentane and methylcyclohexane, as herein illustrated. However, there may be some unsaturation such as in cyclohexane. Also, there may be various other hydrocarbon groups, such as paraffinic or olefinic radicals, attached to these naphthenic structures.

The term "methylamine" is used to denote mono-, di-, or trimethylamine, or mixtures of these.

The present invention is not to be limited by any theory or mode of operation but only in and by the following claims in which it is desired to claim all novelty insofar as the prior art permits.

We claim:

1. A process for the segregation of naphthenes with an average molecular weight less than about 250 from a feed mixture consisting of naphthenes and paraffins, the constituents of which boil over a relatively narrow boiling range, which comprises treating said feed mixture with a solvent comprising liquid ammonia under conditions to form a solvent extract phase containing naphthenes and relatively free of paraffins, and a raffinate phase containing paraffins and relatively free of naphthenes, separating the solvent phase containing naphthenes, and recovering solvent and naphthenes therefrom.

2. A process for the segregation of naphthenes with an average molecular weight less than about 250 from a feed mixture consisting of naphthenes and paraffins, the constituents of which boil over a relatively narrow boiling range, which comprises treating said feed mixture under conditions to form a solvent extract phase containing naphthenes and relatively free of paraffins, and a raffinate phase containing paraffins and relatively free of naphthenes, with a solvent comprising ammonia to which a liquid modifying solvent having the ability to increase the solvent power of the ammonia is added in at least a part of the extraction path, separating the phase containing naphthenes, and recovering solvent and naphthenes therefrom.

3. A process for the segregation of naphthenes with an average molecular weight less than about 250 from a feed mixture consisting of naphthenes and paraffins, the constituents of which boil over a relatively narrow boiling range, which comprises treating said feed mixture under conditions to form a solvent phase containing naphthenes relatively free of paraffins, and a raffinate phase containing paraffins and relatively free of naphthenes, with a solvent comprising liquid ammonia to which methylamine is added in at least a part of the extraction path, separating the phase containing naphthenes, and recovering solvent and naphthenes therefrom.

4. A process for the segregation of naphthenes with an average molecular weight less than about 250 from a feed mixture of naphthenes and paraffins, the constituents of which boil over a relatively narrow boiling range, which comprises treating said feed mixture under conditions to form a solvent extract phase containing naphthenes and relatively free of paraffins, and a raffinate phase containing paraffins and relatively free of naphthenes with a solvent comprising liquid ammonia to which a modifying solvent having the ability to reduce the solvent power of the ammonia is added in at least a part of the extraction path, separating the phase containing naphthenes and recovering solvent and naphthenes therefrom.

5. A process for the segregation of naphthenes with an average molecular weight less than about 250 from a feed mixture of naphthenes and paraffins, which comprises treating said feed mixture under conditions to form a solvent extract phase containing naphthenes and relatively free of paraffins, and a raffinate phase containing paraffins and relatively free of naphthenes, with a solvent comprising a major proportion of liquid ammonia to which is added in at least a part of the extraction path a minor proportion of water, separating the solvent phase containing naphthenes, and recovering solvent and naphthenes therefrom.

6. A process for the segregation of naphthenes with an average molecular weight less than about 250 from a feed mixture of naphthenes and paraffins, which comprises treating said feed mixtures with a solvent comprising ammonia and a liquid modifying solvent which is characterized by having the ability to increase the solvent power of ammonia, and to which is added in at least a part of the extraction path after the feed mixture has contacted the liquid ammonia of increased solvent power a liquid substance having the ability to reduce the solvent power of the solvent, under conditions to form a solvent extract phase containing naphthenes and relatively free of pariffins, and a raffinate phase containing paraffins and relatively free of naphthenes, separating the solvent phase containing naphthenes, and recovering solvent and naphthenes therefrom.

7. A process as defined by claim 6 in which said solvent having the ability to increase the solvent power of ammonia is methylamine, and in which the substance having the ability to decrease the solvent power is water.

8. A process as defined by claim 6 in which said solvent having the ability to increase the solvent power of ammonia is methylamine, and in which the substance having the ability to decrease the solvent power comprises a hydrocarbon slightly soluble in the extract phase but completely soluble in the raffinate phase.

9. A process for the segregation of naphthenes with an average molecular weight less than about 250 from a feed mixture of naphthenes and paraffins, which comprises treating said feed mixture under conditions to form a solvent extract phase containing naphthenes and relatively free of paraffins, and a raffinate phase containing paraffins and relatively free of naphthenes with a solvent comprising liquid ammonia and to which is added in at least a part of the extraction path after the feed mixture has contacted the liquid ammonia a hydrocarbon slightly soluble in the extract phase but completely soluble in the raffinate phase, separating the solvent phase containing naphthenes, and recovering solvent and naphthenes therefrom.

10. A process for the segregation of naphthenes with an average molecular weight less than about 250 from a feed mixture consisting of naphthenes and paraffins, which comprises extracting said mixture at temperatures in the range of 70° F. to 150° F. with ammonia solvent under conditions that there are formed a solvent extract phase containing naphthenes and relatively free of paraffins, and a raffinate phase containing paraffins and relatively free of naphthenes, separating the solvent phase containing naphthenes, and recovering naphthenes and solvent therefrom.

11. A process for the segregation of naphthenes with an average molecular weight less than about 250 from a feed mixture containing the same together with paraffins, which comprises extracting said feed mixture in a countercurrent treating path comprising a stripping zone and an enriching zone with a solvent comprising liquid ammonia, separating at least a part of one of the phases at such an intermediate point in the extraction path that the separated phase is relatively free of paraffins and contains primarily naphthenes and components of greater solubility than the naphthenes together with solvent, and further extracting said separated phase with a solvent comprising a major proportion of liquid ammonia together with a solvent to reduce the solvent power of the ammonia for naphthenes in order to purify the naphthenes.

12. A process for the segregation of naphthenes with an average molecular weight less than about 250 from a feed mixture containing the same together with paraffins and components which are more soluble in the solvent than the naphthenes, which comprises extracting said feed mixture in a countercurrent treating path comprising a stripping zone and an enriching zone with a solvent comprising liquid ammonia, separating at least a part of one of the phases at such an intermediate point in the extraction path that the separated phase consists primarily of naphthenes and paraffins together with solvent, and further extracting said separated phase with a solvent comprising liquid ammonia to separate the naphthenes from the paraffins.

13. A process for the segregation of methylcyclohexane from paraffins which comprises extracting the said mixture at temperatures in the range of 70° F. to 120° F. with a solvent comprising ammonia containing from 10 to 30 per cent methylamine.

14. A process for the segregation of cyclopentane from paraffins of similar boiling point, which comprises extracting the said mixture with liquid ammonia at temperatures in the range of 70° F. to 120° F.

GEORGE H. CUMMINGS.
WILLIAM J. SWEENEY.
MERRELL R. FENSKE.